United States Patent [19] [11] 3,913,526
Hall [45] Oct. 21, 1975

[54] AQUARIUM COVER
[75] Inventor: Frank Kenneth Hall, Saginaw, Mich.
[73] Assignee: O'Dell Manufacturing, Inc., Saginaw, Mich.
[22] Filed: Jan. 11, 1974
[21] Appl. No.: 432,475

Related U.S. Application Data
[63] Continuation-in-part of Ser. No. 302,919, Nov. 1, 1972, Pat. No. 3,805,740.

[52] U.S. Cl. ................................................. 119/5
[51] Int. Cl.² ........................................ A01K 64/00
[58] Field of Search ....................... 119/5; 240/2 LC

[56] References Cited
UNITED STATES PATENTS
3,125,065 3/1964 Willinger ............................... 119/5
3,805,740 4/1974 Hall ........................................ 119/5

FOREIGN PATENTS OR APPLICATIONS
1,185,420 3/1970 United Kingdom ................... 119/5

Primary Examiner—Jay N. Eskovitz

[57] ABSTRACT

An aquarium tank cover comprising an elongate shell-like cover for overlying an aquarium tank to provide a downwardly opening chamber above the tank. An elongate shell-like hood is mounted in the interior of the cover to define a downwardly opening, light-reflecting chamber in which a lamp is mounted, and vertical panels extend between the hood and cover to define a sealed chamber between the hood and cover in which electric components auxiliary to the lamp may be mounted.

15 Claims, 8 Drawing Figures

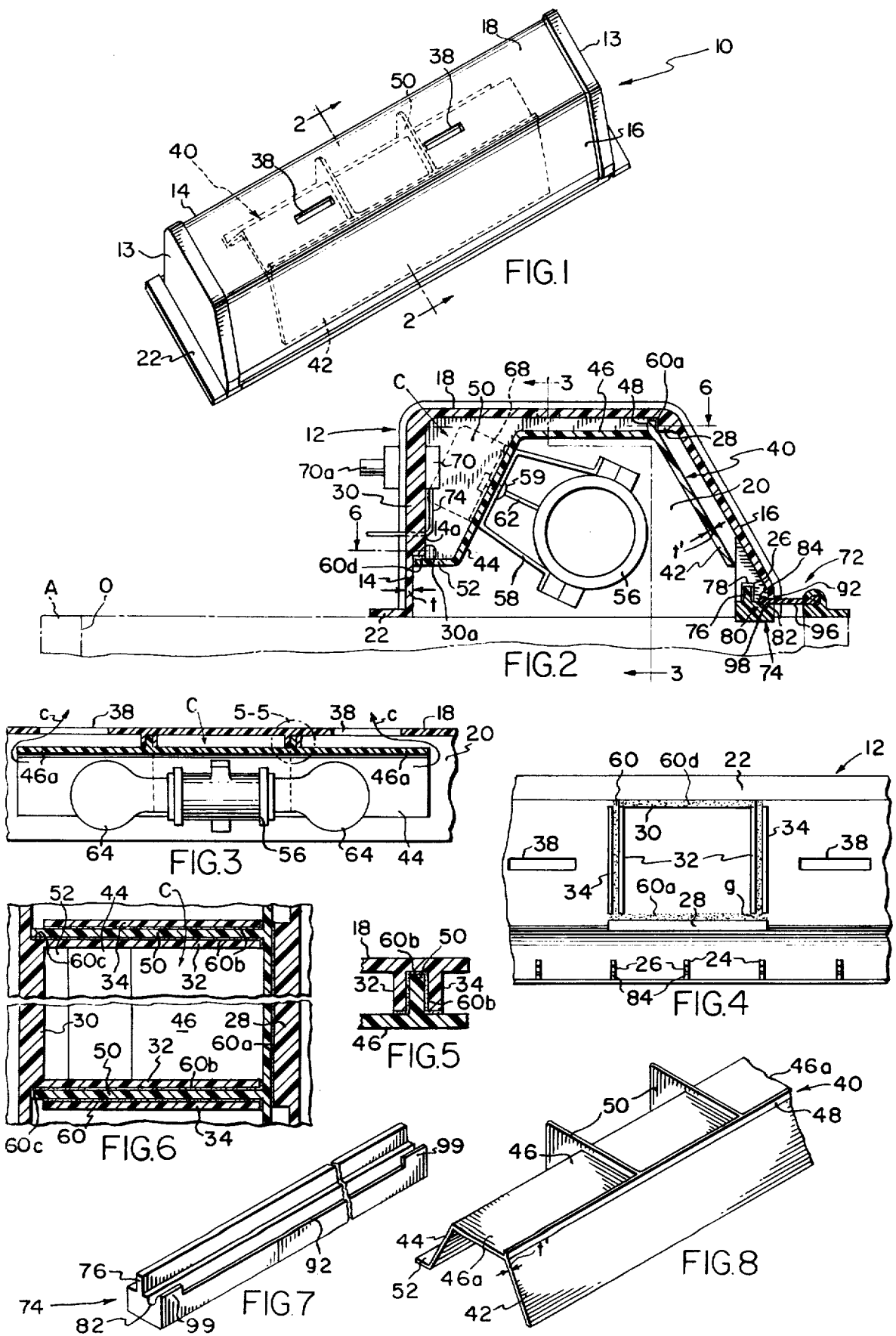

3,913,526

1
AQUARIUM COVER

The application is a continuation-in-part of U.S. application Ser. No. 302,919, filed in the U.S. Patent Office on Nov. 1, 1972, now U.S. Pat. No. 3,805,740, which is incorporated herein by reference.

BACKGROUND OF THE INVENTION

This invention relates to an aquarium cover of the type mounting an aquarium illuminating lamp and electrical circuit componentry which is to be connected in circuit with the lamp but isolated from any water vapor rising from the aquarium.

An aquarium cover, such as that disclosed in the aforementioned U.S. Pat. No. 3,805,740, includes a light reflecting hood which is received in, and extends the full length of, a downwardly opening plastic housing. To minimize material costs and for other reasons, it is desirable to reduce the length of the light reflecting hood without deleteriously affecting the functions performed by the assembly. When the light reflecting hood extends the full length of the housing, the heat in the light reflecting hood in some situations builds to undue levels and decreases the operating efficiency of the lamp or lamps, particularly where incandescent lamps are employed.

It is an object of the present invention to provide an aquarium cover comprising a housing which overlies the aquarium tank on which it mounts and receives a lamp mounting hood which is sealed to the housing inwardly of the housing ends to isolate componentry in the housing from exposure to water vapor.

It is another object of the present invention to provide a ventilated aquarium cover which has improved air circulation and which will vent heated air in the cover to atmosphere.

It is still another object of the present invention to provide an aquarium cover which minimizes material costs as well as assembly costs.

Yet another object of the present invention is to provide an aquarium cover comprising an outer housing receiving a lamp mounting, light reflecting hood which is sealed to the housing at laterally and vertically spaced, side sealing zones, and a pair of opposite end sealing zones, via a continuous seal.

A further object of the present invention is to provide an improved aquarium cover of the type described, mounted for upward swinging movement to provide access to the aquarium.

Other objects and advantages of the present invention will become apparent to those of ordinary skill in the art as the description thereof proceeds.

SUMMARY OF THE INVENTION

The present invention may more readily be understood by reference to the accompanying drawings, in which:

FIG. 1 is a perspective plan view of an aquarium cover constructed according to the present invention;

2
FIG. 2 is an enlarged, sectional end view taken along the line 2—2 of FIG. 1;

FIG. 3 is a sectional front view taken along the line 3—3 of FIG. 2;

FIG. 4 is an enlarged, fragmentary bottom plan view of the housing only;

FIG. 5 is a further enlarged, sectional front view of the cover portion encircled in the chain line 5—5 of FIG. 3;

FIG. 6 is an enlarged, sectional top plan view, of the housing portion taken on the line 6—6 of FIG. 2;

FIG. 7 is an enlarged, perspective plan view of a hinge forming strip incorporated in a cover constructed according to the present invention; and FIG. 8 is an enlarged, perspective view of a light reflecting, lamp mounting hood incorporated in an aquarium cover constructed according to the present invention.

An aquarium cover constructed according to the present invention is generally designated 10, and is particularly adapted to cover an upper opening O in an aquarium tank, schematically designated A. The cover 10, which mounts on the aquarium tank A, comprises a one-piece, downwardly opening, inverted trough-like housing or shell-like cover member, generally designated 12, molded preferably from dark-colored, synthetic plastic material having a substantially uniform wall thickness $t$ (FIG. 2). The housing 12 includes a generally upstanding, front side wall 14 and a vertically inclined rear side wall 16, spanned by a top wall 18 to define the downwardly opening compartment 20. It should be noted that the housing 12 also includes integrally molded end caps 13. The front housing wall 14 is formed with an elongate, locking flange 22 (FIGS. 2 and 4) for separably locking the cover 10 to the aquarium A as described in the referenced patent application.

Integrally molded with the slightly vertically inclined rear housing wall 16 is a plurality of internal, longitudinally spaced, locking projections 24 having notches or recesses 26 for a purpose to be described more fully hereinafter. At the junction of the rear housing wall 16 and the top housing wall 18 is an integrally cast, elongate, hood mounting, quarter-round, bead or projection 28. On the front housing wall 14 is an integrally cast, hood mounting plate or boss 30. Integrally cast with the top housing wall 18 is a pair of internal, vertical, planar, sealing flanges or panels 32 and 34 at each end of the housing boss 30. The inner pair of sealing flanges 32 are integral with the housing boss 30 but terminate short of the laterally opposite housing projection 28 to provide a gap $g$ therebetween (FIG. 4) for a purpose to be described hereinafter.

Air vent holes, generally designated 38, are provided in the top housing wall 18 outwardly of the sealing flanges 34 for venting heated air inside the cover 10 to atmosphere.

Received in the downwardly opening, trough-like housing 12 is a unitary, lamp mounting, light reflecting hood, generally designed 40, which is molded from white, synthetic plastic material. The lamp mounting hood 40 is substantially shorter in length than the overlying housing 12 (FIG. 3) and has a substantially uniform wall thickness $t'$ (FIG. 8). The lamp mounting hood 40 includes generally upstanding front and rear side wall portions 44 and 42 spanned by an upper wall 46. An elongate, generally vertical sealing flange 48, which is integral with the upper end of the rear hood wall 42, is received in the gap g, in abutting relation with the housing projection 28. Generally vertical, longitudinally spaced, transverse sealing flanges or panels 50, which are integral with the vertical flange 48, on the front hood wall 44 and the top hood wall 46 are received between the pairs of vertical sealing flanges 32 and 34 on the housing 12. The flanges 48 and 50 together provide a continuous sealing flange for a componentry compartment C which will later be described in more detail.

The vertical sealing flanges 50 on the upper side of the lamp mounting hood 40 are located inwardly of the upper hood wall end portions 46a (FIG. 3), which underlie the housing vent openings 38 so that heated air underlying the hood can pass around the upper hood wall end portions 46a, and then pass outwardly through the housing vent openings 38, in the paths represented by the arrows c. This air also passes along the upper surface of the hood end wall portions 46a to cool the upper hood wall 46. The cooling of the upper hood wall 46 and the ventilation of the heated air in the cover, minimizes the build-up of heat, and the attendant problems associated therewith, in the hood 40 and the housing 12.

The front hood wall 44 includes a generally horizontal sealing flange 52 which partially underlies the lower surface 30a of the housing boss 30 (see FIG. 2). A continuous bead 60 of sealant is disposed between the sealing flanges 48, 50 and 52, on the lamp mounting hood 40, and the housing projections 28 and 30, and the sealing flanges 32 and 34 on the housing 12 to seal the housing 12 to the hood 40 and provide a compartment generally designated C, which is substantially moisture-free and sealed against any water vapor rising upwardly from the aquarium A on which the hood is supported. More particularly, the bead 60 includes a first elongate bead portion 60a sealed to the inside of the housing projection 28 and also sealed to the hood flange 48; a pair of end bead portions 60b disposed between and sealed to the housing sealing flanges 32, 34 and also sealed to the vertical hood flanges 50; generally vertical bead portions 60c (FIG. 3) sealed to opposite ends of the housing boss 30 and also sealed to the hood flanges 50; and an elongate, generally horizontal, lower side bead portion 60d (FIG. 2) and sealed to the housing block surface 30a and to the horizontal hood flange 52. The bead 60 of sealant may suitably comprise sealing cement, such as a silicone sealant; for example, the water impervious, adhesive sealant manufactured by General Electric Company and sold under the trade designation RTV-108. The continuous bead 60 may be firstly applied to the hood 40, as illustrated in FIG. 4, before the hood 40 and housing 12 are assembled.

A double-ended, lamp mounting socket, generally designated 56, is mounted on the front hood wall 44 via a bracket 58 and a bolt 59 having a passage therethrough for receiving a pair of electrical conductors 62 connected in circuit with the sockets 56. Suitable sealant is placed between the electrical conductors 62 and the bolt 59 to prevent the passage of liquid vapor therebetween. Incandescent lamps 64 may suitably be mounted in opposite ends of the socket 56. An electrical component such as a transformer 68, which is connected in circuit with the lamps 64, may be mounted on the front hood wall 44. A lamp switch, generally designated 70, which is connected in circuit with the lamps 64 via leads 62, is internally mounted on the front housing wall 14 as more particularly disclosed in the referenced patent application. The switch 70 is connected to a source of alternating current, for example, by wires 74 passing through an opening 14a in the wall 14. The switch 70 includes a manually operated, external, actuator 70a, as usual.

A hinge, generally designated 72, is provided for swingably mounting the cover 10 on the aquarium and includes an elongate mounting strip generally designated 74 (FIGS. 2 and 7) provided with an elongate, vertical flange 76 received in the housing projection recesses 26 and sealed to the projection 24 by suitable sealant beads 78. An elongate, hinge-receiving socket 80 (FIG. 2) is defined by an elongate, semi-circular socket portion 82 in the strip 72 and opposing semi-circular cutouts or socket defining recessed portions 84 (FIG. 4) provided in the projections 24 adjacent the recesses 26.

A gap g2 is provided between the rear portion of the mounting strip 74 and the rear housing wall 16 for receiving a reduced portion 96 of a flexible, elongate hinge plate having an elongate bead 98 received in the socket 80. Flanges 99 are provided on the strip 74 at opposite ends of the gap g2 to bear against the rear housing wall 14 to maintain the gap g2.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What is claimed is:

1. An aquarium cover for covering an upper access opening in an aquarium tank comprising:
   a downwardly opening, longitudinally extending, housing defining a chamber, adapted to overlie said access opening;
   a longitudinally extending, lamp mounting, light reflecting hood received in said chamber and dividing said chamber into a pair of horizontally side-by-side chamber sections, the longitudinal extent of said housing being substantially greater than the longitudinal extent of said hood;
   means for mounting an electrically energizable, tank illuminating lamp mounted on the underside of said hood, so as to be at least partially received in one of said chamber sections;
   electrically operable component means mounted on one of said hood and housing, connected in circuit with a portion of said lamp mounting means, received in the other of said chamber sections, interjacent the ends of said light reflecting hood and interjacent the ends of said housing;
   water vapor sealing means for sealing portions of said housing, interjacent the ends of said housing and surrounding said component means to portions of said hood to isolate said electrically energizable component means from any water vapor rising from said aquarium tank; and
   means defining vent holes interjacent said sealing means and the ends of said housing for venting heated air underlying said hood.

2. An aquarium cover for covering an upper access opening in an aquarium tank comprising:

a downwardly opening, longitudinally extending, housing defining a chamber, adapted to overlie said access opening;

a longitudinally extending, lamp mounting light reflecting hood received in said chamber and dividing said chamber into a pair of horizontally side-by-side chamber sections, the longitudinal extent of said housing being substantially greater than the longitudinal extent of said hood;

means for mounting an electrically energizable, tank illuminating lamp mounted on the underside of said hood, so as to be at least partially received in one of said chamber sections;

electrically operable component means mounted on one of said hood and housing, connected in circuit with a portion of said lamp mounting means, received in the other of said chamber sections, interjacent the ends of said light reflecting hood and interjacent the ends of said housing;

water vapor sealing means for sealing portions of said housing, interjacent the ends of said housing and surrounding said component means to portions of said hood to isolate said electrically energizable component means from any water vapor rising from said aquarium tank, said sealing means comprising generally parallel, transversely extendinig, interfitting portions on said hood and said housing, and elongate bead means disposed between said interfitting portions.

3. The aquarium cover as set forth in claim 2 wherein said sealing means includes vertically spaced interfitting side flange means on said hood and said housing at laterally opposite sides of said other chamber section, and interfitting end flange means on said hood and said housing, at opposite ends of said component means, joining said side flange means on said hood and housing respectively.

4. The aquarium cover as set forth in claim 3 wherein said sealing means includes adhesive sealing bead means disposed between said interfitting flange means.

5. An aquarium cover for covering an upper access opening in an aquarium tank comprising:

a downwardly opening, longitudinally extending, housing defining a chamber, adapted to overlie said access opening;

a longitudinally extending, lamp mounting, light reflecting hood received in said chamber and dividing said chamber into a pair of horizontally side-by-side chamber sections, the longitudinal extent of said housing being substantially greater than the longitudinal extent of said hood;

means for mounting an electrically energizable, tank illuminating lamp mounted on the underside of said hood, so as to be at least partially received in one of said chamber sections;

electrically operable component means mounted on one of said hood and housing, connected in circuit with a portion of said lamp mounting means, received in the other of said chamber sections, interjacent the ends of said light reflecting hood and interjacent the ends of said housing;

water vapor sealing means for sealing portions of said housing, interjacent the ends of said housing and surrounding said component means to portions of said hood to isolate said electrically energizable component means from any water vapor rising from said aquarium tank; and an elongate strip, means mounting said strip so that an elongate gap is provided between a portion of said strip and one side of said housing, an elongate, hinge-receiving socket, defined in part by a socket portion in said housing and an opposed socket portion in said strip, communicates with said gap.

6. An aquarium cover for covering an upper access opening in an aquarium tank comprising:

a downwardly opening, longitudinally extending, housing defining a chamber, adapted to overlie said access opening;

a longitudinally extending, lamp mounting, light reflecting hood received in said chamber and dividing said chamber into a pair of chamber sections;

means for mounting an electrically energizable, tank illuminating lamp on the underside of said hood, so as to be at least partially received in one of said chamber sections;

electrically energizable component means, connected in circuit with a portion of said lamp mounting means, received in the other of said chamber sections interjacent the ends of said light reflecting hood;

water vapor sealing means for sealing portions of said housing surrounding said component means to said hood to isolate said electrically energizable component means from any liquid vapor rising from said aquarium tank including:

vertically spaced, side seal means at laterally opposite sides of said other chamber section, and transversely extending end seal means joining said side seal means.

7. The cover as set forth in claim 6 wherein said side seal means comprises interfitting side flange means on said hood and housing and elongate, side bead means disposed between said side flange means, and said end seal means includes interfitting end flange means on said hood and housing and additional elongate bead means disposed between said interfitting end flange means and joined to said elongate side bead means.

8. The cover as set forth in claim 6 including elongate projections on one of said hood and said housing extending along opposing sides of said other chamber section; generally vertical, pairs of longitudinally spaced, vertical end flanges, at opposite ends of said component means, one flange of each pair of flanges being integral with one of said projections but terminating short of the other projection to provide a gap therebetween; and a continuous, generally vertical flange on said other of said hood and housing extending between said vertical pairs of flanges and being received in said gap, said other of said hood and housing including a side flange portion joined to said continuous flange and being generally coextensive with the other of said projections; said sealing means including elongate bead means between the projections and flanges on said housing and said hood.

9. An aquarium cover for covering an upper access opening in an aquarium tank comprising:

a downwardly opening housing, defining a chamber, adapted to overlie said access opening;

a light reflecting, lamp mounting hood mounted in said chamber;

hinge means for pivotally mounting said housing on said aquarium comprising:

an elongate, socket defining strips;

means mounting said socket defining strip so that an elongate hinge receiving gap is provided between a portion of said strip and one side of said housing;

an elongate, hinge strip receiving socket communicating with said gap and defined in part by a socket portion in said housing and an opposed socket portion in said strip; and an elongate hinge strip having a reduced portion received in said gap and an enlarged, elongate bead, received in said gap.

10. The aquarium cover as set forth in claim 9 wherein said housing and said strip include cooperating flange and flange receiving means on one lateral side of said socket for securing said strip to said housing and additional end flange means on said strips at opposite ends of said gap and on the opposite side of said socket, for engaging said housing to maintain said gap.

11. An aquarium tank cover comprising an elongate shell-like cover member adapted to overlie an aquarium tank and defining a downwardly opening chamber, an elongate shell-like hood member mounted in the interior of said cover member having a portion in spaced relationship to said cover member and defining a downwardly opening light-reflecting chamber, the length of said hood being substantially less than that of said cover member, lamp mounting means mounted in the interior of said hood, vertical panel means extending between said hood and cover members defining a sealed chamber between said hood member and said cover member having a longitudinal extent substantially less than that of said hood, and electric component means mounted in said sealed chamber and operatively coupled to said lamp mounting means.

12. The invention defined in claim 11 wherein said shell-like hood member has longitudinally extending front and rear edges sealingly engaged with said cover member, that portion of said hood member between said front and rear edges being spaced inwardly of said cover member to define a longitudinally extending passage therebetween, and said web means extending across said passage to constitute said chamber as a sealed off portion of said passage.

13. The invention defined in claim 12 wherein said sealed chamber is located in the longitudinal center portion of said passage.

14. The invention defined in claim 13 further comprising vent means in said cover member for venting water vapor from the portions of said passage at opposite sides of said sealed chamber.

15. The invention as defined in claim 11 wherein said panel means are formed integrally with one of said cover member and hood member and are sealingly secured to the other of said cover member and hood member.

* * * * *

UNITED STATES PATENT OFFICE
CERTIFICATE OF CORRECTION

Patent No. 3,913,526              Dated October 21, 1975

Inventor(s) Frank Kenneth Hall

It is certified that error appears in the above-identified patent and that said Letters Patent are hereby corrected as shown below:

After SUMMARY OF THE INVENTION in Column 1 insert the following: -- An aquarium tank cover comprising an elongate shell-like cover for overlying an aquarium tank to provide a downwardly opening chamber above the tank. An elongate shell-like hood is mounted in the interior of the cover to define a downwardly opening, light-reflecting chamber in which a lamp is mounted, and vertical panels extend between the hood and cover to define a sealed chamber between the hood and cover in which electric components auxiliary to the lamp may be mounted. --

Column 4, line 1, change "Thee" to --The--.

Column 4, line 14, change "72" to --74--.

Column 5, line 26, change "extendinig" to --extending--.

Signed and Sealed this twentieth Day of April 1976

[SEAL]

Attest:

RUTH C. MASON
*Attesting Officer*

C. MARSHALL DANN
*Commissioner of Patents and Trademarks*